(12) United States Patent
Drake

(10) Patent No.: US 12,094,466 B2
(45) Date of Patent: Sep. 17, 2024

(54) SYSTEM AND METHOD FOR OBTAINING USER FEEDBACK RELATED TO COOKING PROCESSES PERFORMED BY A COOKING APPLIANCE

(71) Applicant: Haier US Appliance Solutions, Inc., Wilmington, DE (US)

(72) Inventor: Jeff Donald Drake, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 277 days.

(21) Appl. No.: 17/590,094

(22) Filed: Feb. 1, 2022

(65) Prior Publication Data

US 2023/0245652 A1 Aug. 3, 2023

(51) Int. Cl.
*A47J 27/62* (2006.01)
*A47J 36/32* (2006.01)
*G10L 15/08* (2006.01)
*G10L 15/22* (2006.01)
*G10L 15/26* (2006.01)

(52) U.S. Cl.
CPC ............. *G10L 15/22* (2013.01); *A47J 27/62* (2013.01); *A47J 36/321* (2018.08); *G10L 15/083* (2013.01); *G10L 15/26* (2013.01); *G10L 2015/088* (2013.01); *G10L 2015/223* (2013.01)

(58) Field of Classification Search
CPC ....... G10L 15/22; G10L 15/083; G10L 15/26; G10L 2015/088; G10L 2015/223; A47J 27/62; A47J 36/321
USPC .......................................... 704/231, 246, 251
See application file for complete search history.

(56) References Cited

U.S. PATENT DOCUMENTS

| 4,503,502 A * | 3/1985 | Chapin | A47J 27/14 99/335 |
|---|---|---|---|
| 10,092,129 B2 | 10/2018 | Jenkins et al. | |
| 10,692,491 B2 | 6/2020 | Sisodia et al. | |
| 2016/0051078 A1* | 2/2016 | Jenkins | F24C 7/08 99/341 |
| 2018/0093814 A1* | 4/2018 | Espinosa | A23L 3/28 |
| 2019/0053332 A1 | 2/2019 | Cheng et al. | |

FOREIGN PATENT DOCUMENTS

CN 111435594 A 7/2020

\* cited by examiner

*Primary Examiner* — George C Monikang
(74) *Attorney, Agent, or Firm* — Dority & Manning, P.A.

(57) ABSTRACT

A cooking appliance and method of obtaining user feedback related to cooking processes performed by the cooking appliance includes operating a heating element to perform the cooking process in accordance with a cooking recipe, determining that the cooking process has been completed, obtaining an audio stream using a microphone mounted to or positioned proximate to the cooking appliance, analyzing the audio stream to identify user feedback related to the cooking recipe, and adjusting at least one parameter of the cooking recipe for implementation during a subsequent cooking process.

19 Claims, 3 Drawing Sheets

SYSTEM AND METHOD FOR OBTAINING USER FEEDBACK RELATED TO COOKING PROCESSES PERFORMED BY A COOKING APPLIANCE

FIELD OF THE INVENTION

The present subject matter relates generally to cooking appliances, and more particularly to systems and method for obtaining and implementing user feedback regarding the performance of cooking appliances.

BACKGROUND OF THE INVENTION

Cooktop or range appliances generally include heating elements for heating cooking utensils, such as pots, pans, and griddles. These heating elements can vary in size, location, and capability across the appliance. Grates, a glass panel, or some other suitable support may be positioned over the heating elements for supporting one or more cooking utensils to facilitate a cooking process. These appliances also often include an internal chamber with dedicated heating elements. Certain cooking appliances can perform cooking processes that follow a specific recipe, e.g., related to the time and temperature of one or more heating elements.

Notably, users of cooking appliances commonly have opinions regarding the outcome of a cooking process and the quality of food produced. For example, a user may be satisfied with the doneness of a cooked item or may think the item is not properly cooked. In addition, the user may have opinions on the amount of salt, spice, or other ingredients added based on the cooking recipe. The user may also have opinions on ingredients that could be added or other changes that could be made to the cooking recipe for an improved outcome during subsequent cooking processes. However, conventional cooking appliances have no way to conveniently track these opinions and feedback. For example, a user may be able to manually interact with the appliance to input specific changes to each cooking recipe but this process is time-consuming and rarely utilized due to inconvenience.

Accordingly, a cooking appliance that utilizes user feedback to improve cooking recipes would be desirable. More specifically, a cooking appliance that automatically obtains user feedback with little or no user interaction and intelligently uses that feedback to improved cooking recipes for better future cooking outcomes would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a cooking system is provided including an appliance including a cabinet and a heating element mounted to the cabinet for selectively performing a cooking process, a microphone mounted to or positioned proximate the appliance, and a controller in operative communication with the microphone and the heating element. The controller is configured to perform the cooking process in accordance with a cooking recipe, determine that the cooking process has been completed, obtain an audio stream using the microphone, analyze the audio stream to identify user feedback related to the cooking recipe, and adjust, based on the user feedback, at least one parameter of the cooking recipe for implementation during a subsequent cooking process.

In another exemplary embodiment, a method for operating a cooking appliance is provided. The cooking appliance includes a heating element and a microphone. The method includes performing a cooking process in accordance with a cooking recipe, determining that the cooking process has been completed, obtaining an audio stream using the microphone, analyzing the audio stream to identify user feedback related to the cooking recipe, and adjusting, based on the user feedback, at least one parameter of the cooking recipe for implementation during a subsequent cooking process.

In another exemplary embodiment, an appliance is provided including a cabinet, an interactive display mounted on the cabinet of the appliance to facilitate implementation of a cooking recipe, a heating element mounted to the cabinet for selectively performing a cooking process in accordance with the cooking recipe, a microphone mounted to or positioned proximate the appliance, and a controller in operative communication with the microphone and the interactive display. The controller is configured to perform the cooking process in accordance with the cooking recipe, determine that the cooking process has been completed, obtain an audio stream using the microphone, analyze the audio stream to identify user feedback related to the cooking recipe, and adjust, based on the user feedback, at least one parameter of the cooking recipe for implementation during a subsequent cooking process.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
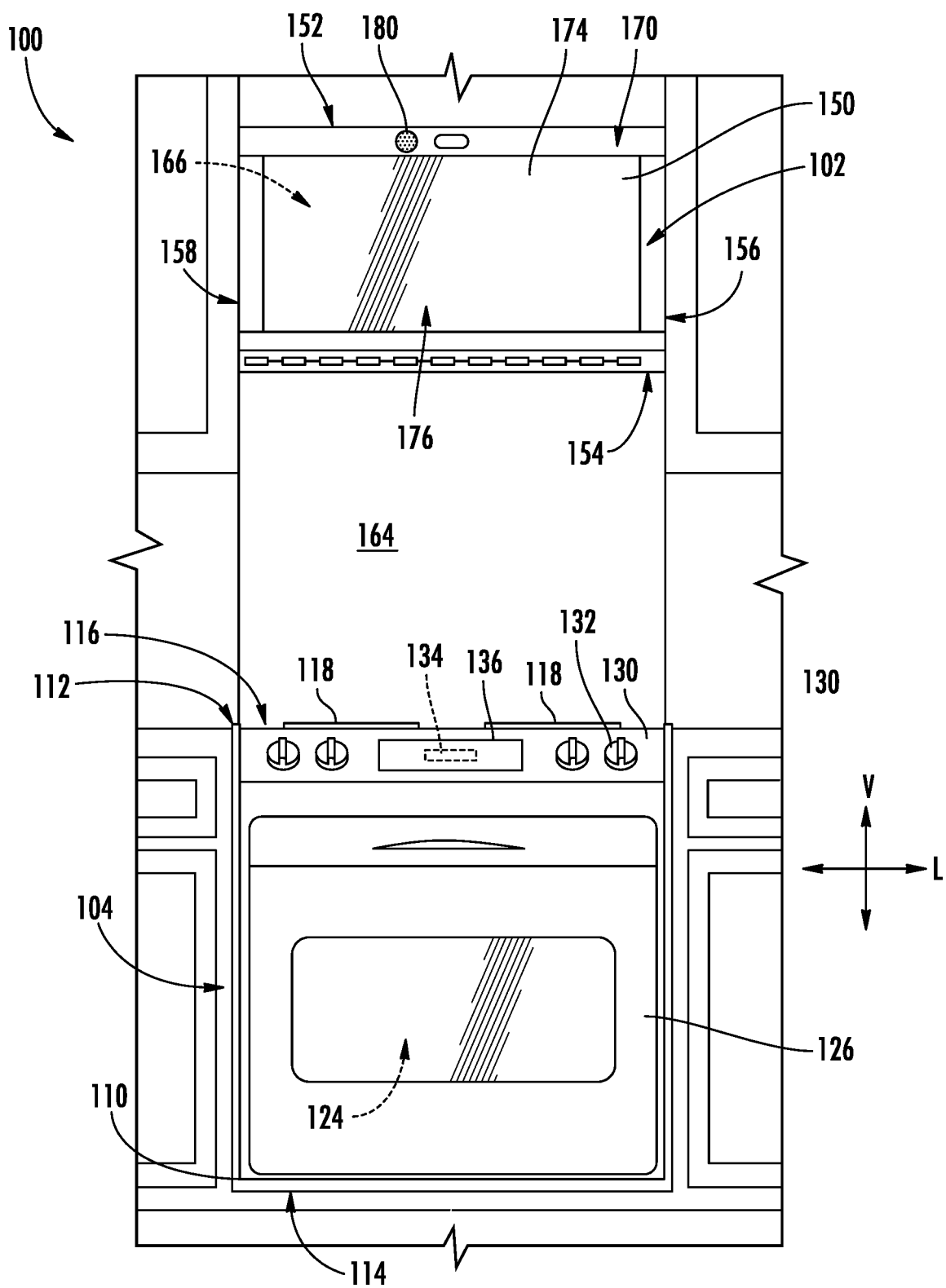
FIG. 1 provides a front view of a system, including a microwave appliance positioned above an oven appliance, according to exemplary embodiments of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
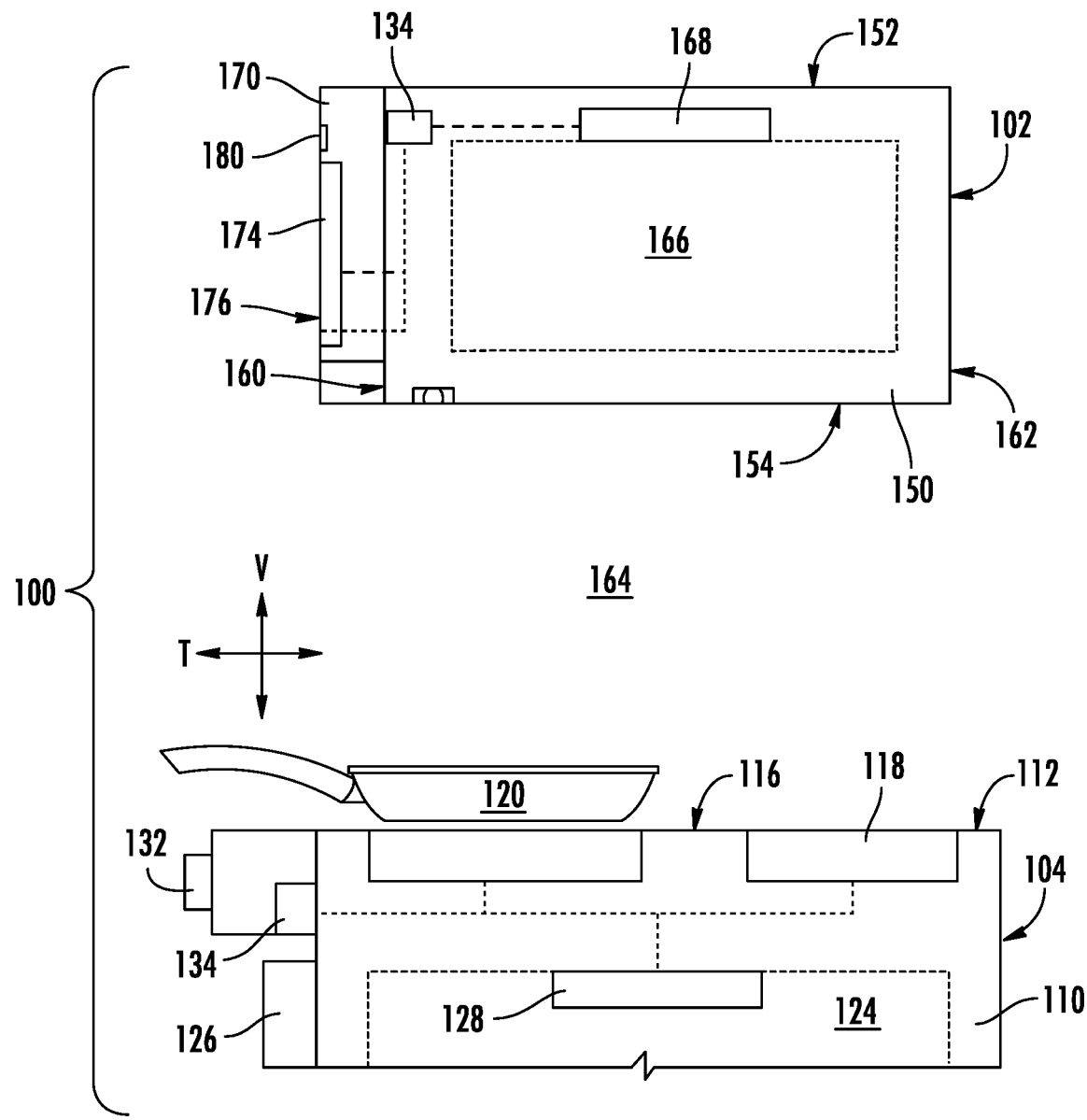
FIG. 2 provides a side schematic view of the exemplary system of FIG. 1 according to exemplary embodiments of the present disclosure.

Turning to the figures, FIGS. 1 and 2 provide various views of a cooking system 100 according to exemplary embodiments of the present disclosure. System 100 generally includes an over-the-range (OTR) appliance, illustrated herein as a microwave appliance 102 that can be positioned or mounted above a cooktop appliance 104. Each of these appliances 102, 104 within system 100 will be described independently and collectively below. However, it should be appreciated that the present subject matter is not limited to the specific appliances disclosed, and the specific appliance configurations are not intended to limit the scope of the present subject matter in any manner. For example, the OTR appliance illustrated herein is a microwave oven. However, according to alternative embodiments, the OTR appliance may be a kitchen hub, a vent hood, an interactive display mounted on a cabinet, etc. Indeed, aspects of the present subject matter are applicable to any suitable cooking appliance.

As shown in FIGS. 1 and 2, system 100 defines a vertical direction V, a lateral direction L, and a transverse direction T. The vertical, lateral, and transverse directions are mutually perpendicular and form an orthogonal direction system. As used herein, this coordinate system applies equally to both microwave appliance 102 and cooktop appliance 104 and will thus be used interchangeably to describe both appliances and their positions relative to each other.

Cooktop appliance 104 can include a chassis or cabinet 110 that extends along the vertical direction V between a top portion 112 and a bottom portion 114; along the lateral direction L between a left side portion and a right side portion; and along the traverse direction T between a front portion and a rear portion. Cooktop appliance 104 includes a cooktop surface 116 having one or more heating elements 118 for use in, for example, heating or cooking operations. In exemplary embodiments, cooktop surface 116 is constructed with ceramic glass. In other embodiments, however, cooktop surface 116 may include of another suitable material, such as a metallic material (e.g., steel) or another suitable non-metallic material.

Heating elements 118 may be various sizes and may employ any suitable method for heating or cooking an object, such as a cooking utensil 120 (FIG. 2), and its contents. In some embodiments, for example, heating element 118 uses a heat transfer method, such as electric coils or gas burners, to heat cooking utensil 120. In other embodiments, however, heating element 118 uses an induction heating method to heat cooking utensil 120 directly. In turn, heating element 118 may include a gas burner element, resistive heat element, radiant heat element, induction element, or another suitable heating element.

In some embodiments, cooktop appliance 104 includes an insulated cabinet 110 that defines a cooking chamber 124 selectively covered by a door 126. One or more heating elements 128 (e.g., top broiling elements or bottom baking elements) may be enclosed within cabinet 110 to heat cooking chamber 124. Heating elements 128 within cooking chamber 124 may be provided as any suitable element for cooking the contents of cooking chamber 124, such as an electric resistive heating element, a gas burner, a microwave element, a halogen element, etc. Thus, cooktop appliance 104 may be referred to as an oven range appliance. As will be understood by those skilled in the art, cooktop appliance 104 is provided by way of example only, and the present subject matter may be used in the context of any suitable cooking appliance, such as a double oven range appliance or a standalone cooktop (e.g., fitted integrally with a surface of a kitchen counter). Thus, the example embodiments illustrated in figures are not intended to limit the present subject matter to any particular cooking chamber or heating element configuration, except as otherwise indicated.

As illustrated, a user interface panel 130 may be provided on cooktop appliance 104. Although shown at front portion of cooktop appliance 104, another suitable location or structure (e.g., a backsplash) for supporting user interface panel 130 may be provided in alternative embodiments. In some embodiments, user interface panel 130 includes input components or controls 132, such as one or more of a variety of electrical, mechanical, or electro-mechanical input devices. Controls 132 may include, for example, rotary dials, knobs, push buttons, and touch pads. A controller 134 is in communication with user interface panel 130 and controls 132 through which a user may select various operational features and modes and monitor progress of cooktop appliance 104. In additional or alternative embodiments, user interface panel 130 includes a display component 136, such as a digital or analog display in communication with a controller 134 and configured to provide operational feedback to a user. In certain embodiments, user interface panel 130 represents a general purpose I/O ("GPIO") device or functional block.

As shown, controller 134 is communicatively coupled (i.e., in operative communication) with user interface panel 130, controls 132, and display 136. Controller 134 may also be communicatively coupled with various operational components of cooktop appliance 104 as well, such as heating elements (e.g., 118, 128), sensors, etc. Input/output ("I/O") signals may be routed between controller 134 and the various operational components of cooktop appliance 104. Thus, controller 134 can selectively activate and operate these various components. Various components of cooktop appliance 104 are communicatively coupled with controller 134 via one or more communication lines such as, for example, conductive signal lines, shared communication busses, or wireless communications bands.

In some embodiments, controller 134 includes one or more memory devices and one or more processors. The processors can be any combination of general or special purpose processors, CPUs, or the like that can execute programming instructions or control code associated with operation of cooktop appliance 104. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 134 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 134 includes a network interface such that controller 134 can connect to and communicate over one or more networks with one or more network nodes. Controller 134 can also include one or more transmitting, receiving, or transceiving components for transmitting/receiving communications with other devices communicatively coupled with cooktop appliance 104, such as microwave appliance 102. Additionally, or alternatively, one or more transmitting, receiving, or transceiving components can be located off board controller 134. Generally, controller 134 can be positioned in any suitable location throughout cooktop appliance 104. For example, controller 134 may be located proximate user interface panel 130 toward front portion of cooktop appliance 104. In optional embodiments, controller 134 is in operable communication with a controller 134 (described below) of microwave appliance 102 (e.g., through one or more wired or wireless channels).

As noted above, microwave appliance 102 may be positioned or mounted above cooktop appliance 104 (e.g., as an OTR microwave). Specifically, an insulated cabinet 150 of microwave appliance 102 may be positioned above cooktop appliance 104 along the vertical direction V. As shown, cabinet 150 of microwave appliance 102 includes a plurality of outer walls and when assembled, microwave appliance 102 generally extends along the vertical direction V between a top end 152 and a bottom end 154; along the lateral direction L between a first side end 156 and a second side end 158; and along the transverse direction T between a front end 160 and a rear end 162. In some embodiments, cabinet 150 is spaced apart from cooktop surface 116 along the vertical direction V. An open region 164 may thus be defined along the vertical direction V between cooktop surface 116 and bottom end 154 of cabinet 150. Although a generally rectangular shape is illustrated, any suitable shape or style may be adapted to form the structure of cabinet 150. Within cabinet 150, an internal liner of cabinet 150 defines a cooking chamber 166 for receipt of food items for cooking.

Microwave appliance 102 is generally configured to heat articles (e.g., food or beverages) within cooking chamber 166 using electromagnetic radiation. Microwave appliance 102 may include various components which operate to produce the electromagnetic radiation, as is generally understood. For example, microwave appliance 102 may include a heating assembly 168 having a magnetron (e.g., a cavity magnetron), a high voltage transformer, a high voltage capacitor, and a high voltage diode, as is understood. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to cooking chamber 166.

The structure and intended function of microwave ovens or appliances are generally understood by those of ordinary skill in the art and are not described in further detail herein. According to alternative embodiments, microwave appliance 102 may include one or more heating elements, such as electric resistance heating elements, gas burners, other microwave heating elements, halogen heating elements, or suitable combinations thereof, are positioned within cooking chamber 166 for heating cooking chamber 166 and food items positioned therein.

Microwave appliance 102 includes a door assembly 170 that is movably mounted (e.g., rotatably attached) to cabinet 150 in order to permit selective access to cooking chamber 166. Specifically, door assembly 170 can move between an open position (not pictured) and a closed position (e.g., FIG. 1). The open position permits access to cooking chamber 166 while the closed position restricts access to cooking chamber 166. Except as otherwise indicated, with respect to the directions (e.g., the vertical direction V, the lateral direction L, and the transverse direction T), the door assembly 170 is described in the closed position. A handle (not shown) may be mounted to or formed on door assembly 170 to assist a user with opening and closing door assembly 170. As an example, a user can use the handle to open or close door assembly 170 and access or cover cooking chamber 166. Additionally, or alternatively, microwave appliance 102 may include a door release button (not pictured) that disengages or otherwise pushes open door assembly 170 when depressed.

Referring still generally to FIGS. 1 through 2, microwave appliance 102 may include an interactive display 174. According to the illustrated embodiment, interactive display 174 is mounted to or within a door assembly 170 and defines substantially the entire front surface of door assembly 170. In this regard, interactive display 174 extends along substantially the entire width of door assembly 170 along the lateral direction L and substantially along the entire height of door assembly 170 along the vertical direction V.

Generally, interactive display 174 may be any suitable type of mechanism for visually presenting a digital (e.g., interactive) image. For example, interactive display 174 may be an image monitor such as a liquid crystal display (LCD), a plasma display panel (PDP), a cathode ray tube (CRT) display, etc. Thus, interactive display 174 includes an imaging surface 176 (e.g., screen or display panel) at which the digital image is presented or displayed as an optically-viewable picture (e.g., static image or dynamic video) to a user. As illustrated, the imaging surface 176 generally faces, or is directed toward the area forward from the appliance 102 (e.g., when door assembly 170 is in the closed position). During use, a user standing in front of microwave appliance 102 may thus see the optically-viewable picture (e.g., recipe, dynamic video stream, graphical user interface, etc.) displayed at the imaging surface 176.

The optically-viewable picture at the imaging surface 176 may correspond to any suitable signal or data received or stored by microwave appliance 102 (e.g., at controller 134). As an example, interactive display 174 may present recipe information in the form of viewable text or images. As another example, interactive display 174 may present a captured image, such as a live (e.g., real-time) dynamic video stream received from a camera assembly and may include suitable virtual timers (as described below). As yet another example, interactive display 174 may present a graphical user interface (GUI) (e.g., as part of user interface) that allows a user to select or manipulate various operational features of microwave appliance 102 or cooktop appliance 104. During use of such GUI embodiments, a user may engage, select, or adjust the image presented at interactive display 174 through any suitable input, such as gesture controls detected through a camera assembly, voice controls detected through one or more microphones, associated touch panels (e.g., capacitance or resistance touch panels) or sensors overlaid across imaging surface 176, etc. According to the illustrated embodiment, interactive display 174 is a tablet or touch screen display that extends an entire width and height of door assembly 170 and provides for an interactive experience to the user of microwave appliance 102.

Similar to cooktop appliance 104, microwave appliance 102 may include a controller 134 that facilitates operation of microwave appliance 102. In addition, it should be appreciated that according to exemplary embodiments, in addition to interactive display 174, microwave appliance may further include an additional user interface panel (e.g., similar to user interface panel 130), user inputs (e.g., similar to user inputs 132), a controller (e.g., similar to controller 134), and/or additional displays (such as display 136). Controller 134 may be mounted within cabinet 150, may be mounted within or be a part of interactive display 174, or may be positioned and integrated in any other suitable manner. In some embodiments, cooktop controller 134 is provided as or as part of microwave controller 134. In alternative embodiments, cooktop controller 134 is a discrete unit in selective operable communication with microwave controller 134 (e.g., through one or more wired or wireless channels). A detailed description of such components is omitted here for brevity.

Referring still to FIGS. 1 and 2, cooking system 100 may further include one or more microphones 180 that are generally positioned and configured for monitoring sound around cooking system 100, e.g., within the room containing cooking system 100. For example, according to the illustrated embodiment, a single microphone 180 is mounted to microwave appliance 102 above interactive display 174. Microphone 180 is generally configured for monitoring sound, voice inputs from the user of cooking system 100, etc. As used herein, the terms microphone and the like are generally intended to refer to any suitable audio input, such as a microphone, an acoustic pickup, sound receiver/transmitter, or any of sound receiving device.

In addition, it should be appreciated that any suitable number, type, position, and configuration of microphones may be used while remaining within the scope of the present subject matter. For example, according to the illustrated embodiment, a single microphone 180 is mounted to microwave appliance 102 above interactive display 174 for monitoring sounds and voices around cooking system 100 (e.g., within the kitchen, dining room, etc.). As described herein, detected sounds and voices may be used to improve cooking process performed by microwave appliance 102, cooktop appliance 104, etc. However, according to alternative embodiments, microphone 180 could be mounted to cooktop appliance 102 or could be a standalone device that is in operative communication with any suitable cooking appliance to provide feedback regarding a cooking process.

In general, cooking system 100 includes one or more controllers (e.g., controller 134) that may be include a recipe software application that is executed and/or displayed on interactive display 174 to facilitate performance of a cooking process using microwave appliance 102, cooktop appliance 102, or both. In this regard, the recipe software application may generally be configured to display user instructions regarding the recipe, automatically adjust burners or heating elements according to a desired heating schedule or profile, or implement other steps associated with the cooking process. These instructions, heating schedules, etc. may generally be referred to herein as a "cooking recipe" for performing the cooking process. It should be appreciated that cooking recipes may be programmed into controller 134, may be downloaded from the Internet, or may be installed and executed by controller 134 and interactive display 174 in any suitable manner.

Now that the construction of system 100 according to exemplary embodiments have been presented, an exemplary method 200 of operating a cooking appliance will be described. Although the discussion below refers to the exemplary method 200 of using microphone 180 to monitor and manage a cooking processes being performed on cooktop appliance 104, one skilled in the art will appreciate that the exemplary method 200 is applicable to the monitoring of cooking processes on any suitable number and type of appliances. In exemplary embodiments, the various method steps as disclosed herein may be performed by controller 134 or a separate, dedicated controller.

Figure 3:
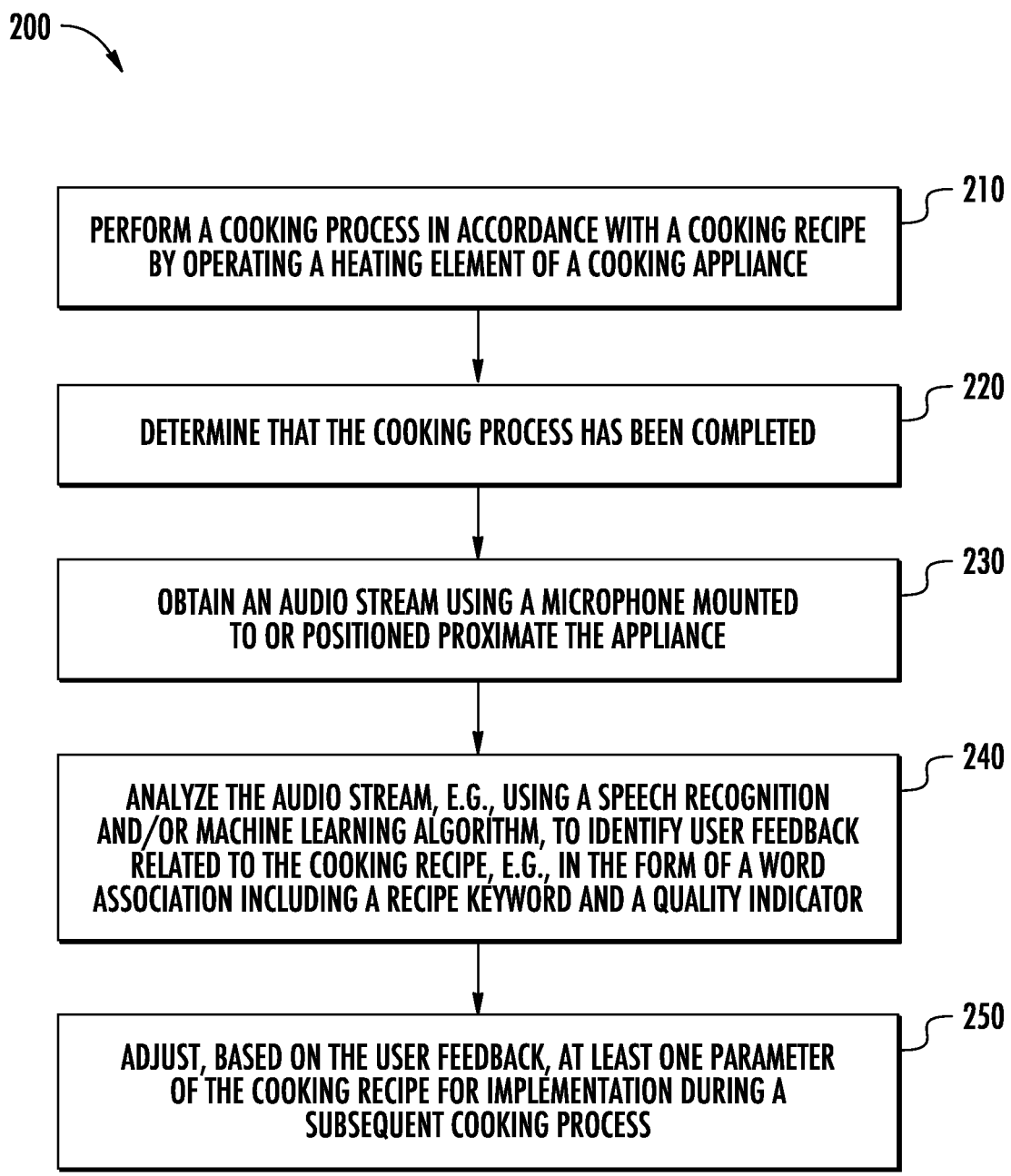
FIG. 3 provides a method of operating a cooking appliance according to an exemplary embodiment of the present subject matter.

Referring now to FIG. 3, method 200 includes, at step 210, performing a cooking process in accordance with a cooking recipe. In this regard, continuing the example from above, the cooking process may include searing steak on the cooktop, preparing casserole ingredients on the cooktop before placing the casserole in the cooking chamber for baking, baking a chicken dish in the cooking chamber, using the microwave to cook an item, etc. It should be appreciated that the cooking processes described herein are only intended to facilitate the discussion of aspects of the present subject matter and are not intended to be limiting in any manner.

As used herein, the terms "cooking recipe" and the like are generally intended to refer to the steps, details, ingredients, heating schedules, and/or other cooking instructions or parameters related to the performance of a particular cooking process. As explained above, these cooking recipes may be programmed into controller 134 for searching and selection by the user, may be input into the controller by the user, may be downloaded from the Internet, or may be obtained in any other suitable manner. In general, the user may select the desired cooking recipe, e.g., using interactive display 174, and may initiate a cooking process by pressing a button to start the recipe. The interactive display 174 may then instruct the user as to the recipe directions while simultaneously making adjustments to the appliance to perform the cooking process, e.g., by adjusting one or more heating elements.

Notably, the cooked food items are commonly consumed by the user of the appliance immediately upon completion of the cooking process. In addition, the user may commonly make statements, generate noises, or provide other feedback during or after consumption of the food that relates to the food quality, the user's appreciation of the food, the user's distaste with respect to the food, other user preferences associated with the food, etc. As noted above, this user feedback may be very useful information for improving the cooking recipes stored by controller 134. However, this information must typically be manually input by the user, e.g., via a user interface or user satisfaction survey. These burdensome input methods often dissuade users from providing feedback at all. Accordingly, aspects of the present subject matter are directed to methods for easily obtaining user feedback with little to no manual involvement or burden on the user.

In this regard, step 220 includes determining that the cooking process has been completed. In this regard, when the cooking recipe is implemented using a recipe software application, determining that the cooking process has been completed may include determining that a recipe software application has been closed. For example, if the user finishes the cooking process and utilizes the interactive display 174 to close the recipe software application, it may be assumed that the cooking process is complete. Alternatively, determining that the cooking process has been completed may include determining that the heating element has been turned off or determining that a cooking utensil has been removed from the appliance or the heating element (e.g., using a pan sensor, a door sensor, etc.).

Step 230 includes obtaining an audio stream using the microphone. This step may be performed immediately after the cooking process has been completed (e.g., as determined at step 220) in order to capture useful audio related to the user's opinions regarding the cooking process. In general, the audio stream obtained at step 230 may include a voice input from a user of the cooking system 100. As described in detail below, this voice input may be used to provide feedback regarding a cooking process. For example, the voice input may include a string of words that may be analyzed to detect user feedback, opinions, preferences, etc.

Step 240 includes analyzing the audio stream to identify user feedback related to the cooking recipe. For example, analyzing the audio stream to identify the user feedback related to the cooking recipe may include detecting one or more word associations, keywords, or other phrases that indicate that the audio stream is related to the cooking recipe. In this regard, for example, word associations may include any suitable combination of words or phrases that collectively provide useful information for adjusting a cooking recipe. In this regard, if the audio stream includes the word "cold," this alone may not be sufficient to merit a cooking recipe parameter change. For example, the user may be speaking of a room temperature and not the food itself. However, if the word "cold" is stated in proximity with a food-related word, such as "chicken," "meat," "casserole," etc., these terms may collectively form a word association that results in a parameter change to the cooking recipe. In this regard, the term "cold" in association with the food may result in higher heat levels or a longer cooking time. By contrast, the term "hot" in association with the food may result in lower heat levels or a shorter cooking time.

According to exemplary embodiments, such word associations may include a recipe keyword and a quality indicator. The recipe keyword may be any term or phrase that indicates that the conversation piece is centered around the food cooked according to the recipe. Such recipe keywords may include food, meat, chicken, steak, dinner, breakfast, meal, tastes, etc. The quality indicator may be any term or phrase that provides qualitative or quantitative feedback regarding the food, such as hot, cold, spicy, salty, bland, gross, great, tasty, etc. These recipe keywords and quality indicators may be interpreted by controller 134 to make suitable recipe adjustments, as described below. According to still other embodiments, the voice input may recommend changes to the recipe directly, such as "this dish could use some oregano."

It should be appreciated that the analysis of the audio stream may include the use of any suitable speech recognition algorithms, speech-to-text programs, or other methods to convert the audio stream into a text stream or a listing for words. In addition, step 240 may include any suitable any suitable sound analysis, decomposition, or recognition software or algorithm. In this regard, as would be appreciated by one of ordinary skill in the art, the voice input may be broken down into a plurality of tokens, e.g., such as a timestamp associated with each word in a text string, a location of the text relative to other words within the voice input, etc. In addition, the various words detected within the voice input may be broken into word types such as recipe keywords, qualitative or quantitative indicators, or other categories.

According, to such an embodiment, the text stream may then be analyzed to extract useful user feedback or other information related to the recipe from which cooking recipe parameter adjustments may be made, as described in more detail below. In addition, the analysis performed (either on the audio stream or converted textual data) may include the use of any suitable machine learning algorithm, neural network analysis, deep learning, or other artificial intelligence methods. In addition, the analysis may utilize any other suitable sound processing and recognition techniques while remaining within the scope of the present subject matter.

In addition, it should be appreciated that some or all of the sound processing, voice detection, speech recognition, and feedback analysis may be performed locally, remotely, or in any other distributed manner. In this regard, for example, controller 134 may include a sound processing module (not shown) that is operably coupled with microphone 180 and is programmed for receiving sound signals and analyzing those signals to identify keywords, word associations, and other user feedback. Controller 134 may further include a database (or may perform sound training to populate a database) with potential sounds or voice inputs for comparing with detected sound. Notably, controller 134 may further be configured for learning sounds, word associations, or other voice input associated with user feedback for use in adjusting cooking recipes. For example, common user voice inputs or operating noises may be intentionally generated to train a neural network model. That model may then be used to detect particular voice inputs associated with user feedback. Such voice inputs may be stored locally on controller 134 or a remote server.

In this manner, controller 134 may associate a given voice input with user feedback that may be used to adjust and/or improve cooking recipes. In addition, or alternatively, controller 134 may include a wireless communication module (not shown) for communicating with a remote server, a remote device, etc. In this manner, controller 134 may be configured for communicating detected sound to an external sound processing device, e.g., via the wireless communication module and a network. This external sound processing device, which may be stored on a remote server and may be configured for analyzing the sound signal to identify the user feedback.

In addition, it should be appreciated that the sound signal and/or sound signature may be converted into any suitable form, may be compressed, may be transmitted, and may otherwise be manipulated in any suitable manner to improve analysis. Moreover, the sound processing module may transmit some or all of the sound signal to an external processing device. In this regard, the sound processing module makes it easier or less data intensive to transmit and analyze sound signals. Thus, for example, the sound processing module may transmit the sound signal (e.g., or the compressed sound signal) to a remote server for analysis. The sound processing module may further be configured for receiving analytic feedback from the remote server. In this manner, data processing may be offloaded from controller 134.

Step 250 includes adjusting, based on the user feedback, at least one parameter of the cooking recipe. For example, the cooking recipe may be updated or modified before being stored in memory on controller 134 for subsequent use. In this regard, for example, the revised cooking recipe may be implemented during a subsequent cooking process that uses the same recipe. In addition, it should be appreciated that the user feedback may also be used to modify other similar recipes. For example, if the cooking recipe included cooking a chicken breast in a pan and the user feedback was that the chicken was overcooked or undercooked, similar recipes that include cooking chicken breasts in a pan may be similarly modified, even when other recipe steps may be different.

As used herein, a "parameter" of a cooking recipe is generally intended to refer to any heat setting, ingredient, recipe step, cook time, or any other operating characteristic of cooking system 100 that may affect the performance of cooking process. For example, the parameter of a cooking recipe may also include user instructions, such as the order or sequence of adding ingredients, placing a lid on a cooking utensil, turning meat, etc. Thus, references to parameter adjustments to a cooking recipe are intended to refer to control actions implemented by cooking system 100 or actions taken by a user of the appliance that are intended to improve the cooking process based on the user feedback.

For example, if the user feedback is that an item is undercooked, the cooking recipe parameters may be adjusted to increase a cook time or increase a heat level during a subsequent cooking cycle. If the user feedback is that the sauce in a dish is too thin, the cooking recipes parameters may be adjusted to extend a simmer time or delay a step of adding additional ingredients during a subsequent cooking process utilizing the recipe to permit the sauce to thicken. Other parameter adjustments are possible and within the scope of the present subject matter.

According to exemplary embodiments, method 200 may further include obtaining a user confirmation before making parameter adjustments to one or more cooking recipes. In this regard, for example, adjusting the at least one parameter of the cooking recipe for implementation during the subsequent cooking process may include determining a suggested adjustment of the at least one parameter of the cooking recipe based on the user feedback, providing a user notification of the suggested adjustment, and receiving a user confirmation to adjust the at least one parameter of the cooking recipe. For example, the user notification and the user confirmation may be communicated through the interactive display, through a remote device (e.g., a user's mobile phone), etc. In this regard, when a user selects a cooking recipe using interactive display 174, the controller may display suggested recipe changes based on a prior performance of the recipe (or a similar recipe). The user may then use interactive display 174 to select which suggested adjustments should be implemented.

FIG. 3 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using system 100 and microphone 180 as an example, it should be appreciated that these methods may be applied to the operation of any suitable cooking appliance.

As explained above, aspects of the present subject matter are generally directed to systems and methods for operating a cooking appliance to perform cooking recipes that are automatically adjusted based on user feedback. For example, the present subject matter focuses on a cooking software application that stores cooking recipes and uses an associated cooking appliance to perform a cooking process in accordance with the cooking recipe. Specifically, once a user has finished a cooking recipe, the cooking software application on the cooking appliance or a device connected to the cooking appliance starts listening to audio in the surrounding room. This sound listening service may thus begin at the end of a completed recipe, and the cooking software application may store the recipe identification for the cooking recipe and detected keywords of audio before eventually timing out or stopping the listening process. The sound listening service can listen for keywords like delicious, salty, gross, cold, raw, etc. to identify that the users are discussing the food prepared in accordance with the cooking recipe. Once a keyword has been detected, the cooking software application may use any suitable voice recognition process (e.g., such as a machine learning algorithm, a speech recognition algorithm, etc.). The converted text may then be evaluated to determine how the comments are associated with the cooking recipe. The cooking software application may then use this information to better understand the user's preferences or even suggest augmentations/changes to a cooking recipe that may be used if they run the same cooking recipe. In addition, the cooking software application can identify user preferences with respect to one recipe and preferences on similar recipes or processes. Accordingly, the cooking software application collects feedback from the user without forcing them to manually input the information, resulting in improved cooking processes with little to no user effort.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking system comprising:
   an appliance comprising a cabinet and a heating element mounted to the cabinet for selectively performing a cooking process;
   a microphone mounted to or positioned proximate the appliance; and
   a controller in operative communication with the microphone and the heating element, the controller being configured to:
   perform the cooking process in accordance with a cooking recipe;
   determine that the cooking process has been completed, wherein determining that the cooking process has been completed comprises determining that a cooking utensil has been removed from the appliance or the heating element;
   obtain an audio stream using the microphone;
   analyze the audio stream to identify user feedback related to the cooking recipe; and
   adjust, based on the user feedback, at least one parameter of the cooking recipe for implementation during a subsequent cooking process.

2. The cooking system of claim 1, wherein the cooking recipe is implemented using a recipe software application, and wherein determining that the cooking process has been completed comprises:

determining that a recipe software application has been closed.

3. The cooking system of claim 1, wherein analyzing the audio stream to identify the user feedback related to the cooking recipe comprises:
    analyzing the audio stream to detect a word association indicating that the audio stream is related to the cooking recipe; and
    determining the user feedback using the word association.

4. The cooking system of claim 3, wherein the word association comprises a recipe keyword and a quality indicator.

5. The cooking system of claim 1, wherein analyzing the audio stream to identify the user feedback related to the cooking recipe comprises using a speech recognition algorithm to convert the audio stream into a text stream.

6. The cooking system of claim 1, wherein analyzing the audio stream to identify the user feedback related to the cooking recipe comprises using a machine learning algorithm.

7. The cooking system of claim 1, wherein adjusting, based on the user feedback, the at least one parameter of the cooking recipe for implementation during the subsequent cooking process comprises:
    determining a suggested adjustment of the at least one parameter of the cooking recipe based on the user feedback;
    providing a user notification of the suggested adjustment; and
    receiving a user confirmation to adjust the at least one parameter of the cooking recipe.

8. The cooking system of claim 7, further comprising:
    an interactive display operably coupled to the appliance, wherein the user notification and the user confirmation are communicated through the interactive display.

9. The cooking system of claim 8, wherein the interactive display is mounted on the cabinet of the appliance.

10. The cooking system of claim 1, wherein the controller is further configured to:
    identify a similar cooking recipe to the cooking recipe; and
    adjust, based on the user feedback related to the cooking recipe, at least one parameter of the similar cooking recipe.

11. The cooking system of claim 1, wherein the appliance is an over-the-range appliance, a microwave oven, a cooktop appliance, an oven appliance, or another cooking appliance.

12. A method for operating a cooking appliance, the cooking appliance comprising a heating element and a microphone, the method comprising:
    performing a cooking process in accordance with a cooking recipe;
    determining that the cooking process has been completed, wherein determining that the cooking process has been completed comprises determining that a cooking utensil has been removed from the appliance or the heating element;
    obtaining an audio stream using the microphone;
    analyzing the audio stream to identify user feedback related to the cooking recipe; and
    adjusting, based on the user feedback, at least one parameter of the cooking recipe for implementation during a subsequent cooking process.

13. The method of claim 12, wherein the cooking recipe is implemented using a recipe software application, and wherein determining that the cooking process has been completed comprises:
    determining that a recipe software application has been closed.

14. The method of claim 12, wherein analyzing the audio stream to identify the user feedback related to the cooking recipe comprises:
    analyzing the audio stream to detect a word association indicating that the audio stream is related to the cooking recipe; and
    determining the user feedback using the word association.

15. The method of claim 14, wherein the word association comprises a recipe keyword and a quality indicator.

16. The method of claim 12, wherein analyzing the audio stream to identify the user feedback related to the cooking recipe comprises using a speech recognition algorithm to convert the audio stream into a text stream or using a machine learning algorithm.

17. The method of claim 12, wherein adjusting, based on the user feedback, the at least one parameter of the cooking recipe for implementation during the subsequent cooking process comprises:
    determining a suggested adjustment of the at least one parameter of the cooking recipe based on the user feedback;
    providing a user notification of the suggested adjustment; and
    receiving a user confirmation to adjust the at least one parameter of the cooking recipe.

18. An appliance comprising:
    a cabinet;
    an interactive display mounted on the cabinet of the appliance to facilitate implementation of a cooking recipe;
    a heating element mounted to the cabinet for selectively performing a cooking process in accordance with the cooking recipe;
    a microphone mounted to or positioned proximate the appliance; and
    a controller in operative communication with the microphone and the interactive display, the controller being configured to:
        perform the cooking process in accordance with the cooking recipe;
        determine that the cooking process has been completed, wherein determining that the cooking process has been completed comprises determining that a cooking utensil has been removed from the appliance or the heating element;
        obtain an audio stream using the microphone;
        analyze the audio stream to identify user feedback related to the cooking recipe; and
        adjust, based on the user feedback, at least one parameter of the cooking recipe for implementation during a subsequent cooking process.

19. The appliance of claim 18, wherein analyzing the audio stream to identify the user feedback related to the cooking recipe comprises:
    analyzing the audio stream to detect a word association indicating that the audio stream is related to the cooking recipe; and
    determining the user feedback using the word association, the word association comprising a recipe keyword and a quality indicator.

* * * * *